F. D. JOBE.
COOKING VESSEL.
APPLICATION FILED MAR. 9, 1920.

1,390,908.

Patented Sept. 13, 1921.
2 SHEETS—SHEET 1.

F. D. Jobe
INVENTOR

BY *Victor J. Evans*
ATTORNEY

WITNESS:

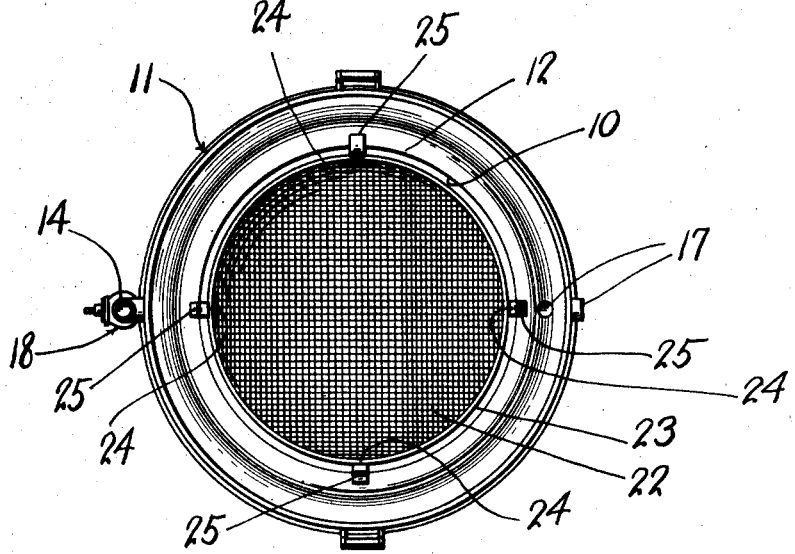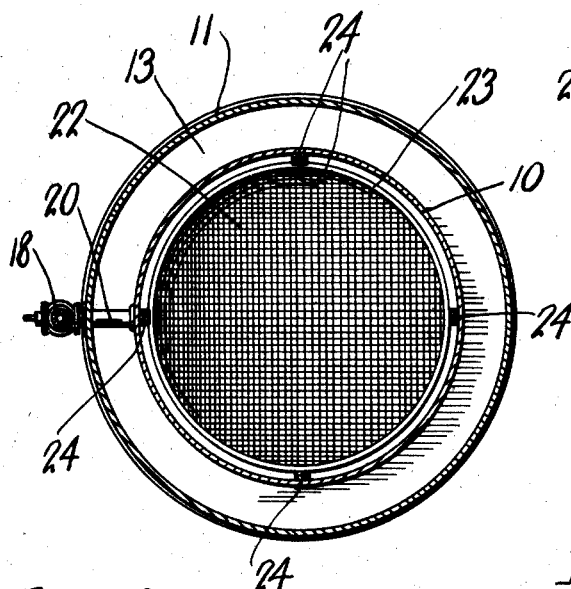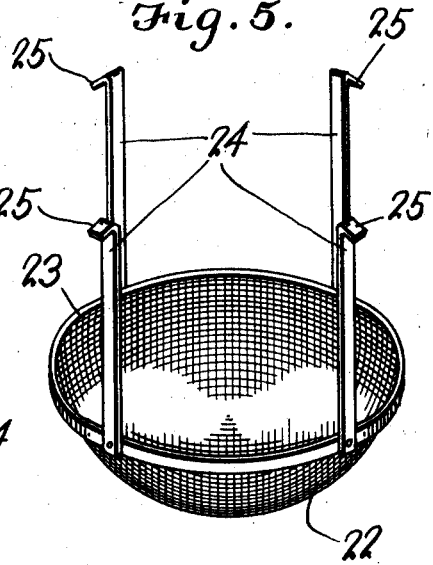

UNITED STATES PATENT OFFICE.

FRED D. JOBE, OF ROUNDUP, MONTANA.

COOKING VESSEL.

1,390,908.  Specification of Letters Patent.  Patented Sept. 13, 1921.

Application filed March 9, 1920. Serial No. 364,496.

*To all whom it may concern:*

Be it known that I, FRED D. JOBE, a citizen of the United States, residing at Roundup, in the county of Musselshell and State of Montana, have invented new and useful Improvements in Cooking Vessels, of which the following is a specification.

This invention relates to cooking utensils and comprehends the provision of a steamer, including among other features spaced inner and outer receptacles defining a water chamber by the intervening space therebetween, and a plurality of trays arranged and supported within the inner receptacle in a novel manner.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Fig. 3 is a top plan view with the cover removed.

Fig. 4 is a transverse sectional view taken on line 4—4 of Fig. 1.

Fig. 5 is a perspective view of one of the trays.

Figure 1:
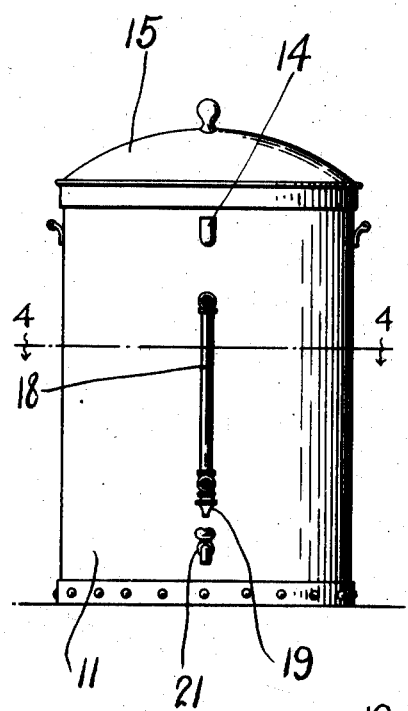
Figure 1 is a view in elevation of the steamer forming the subject matter of my invention.
Figure 2:
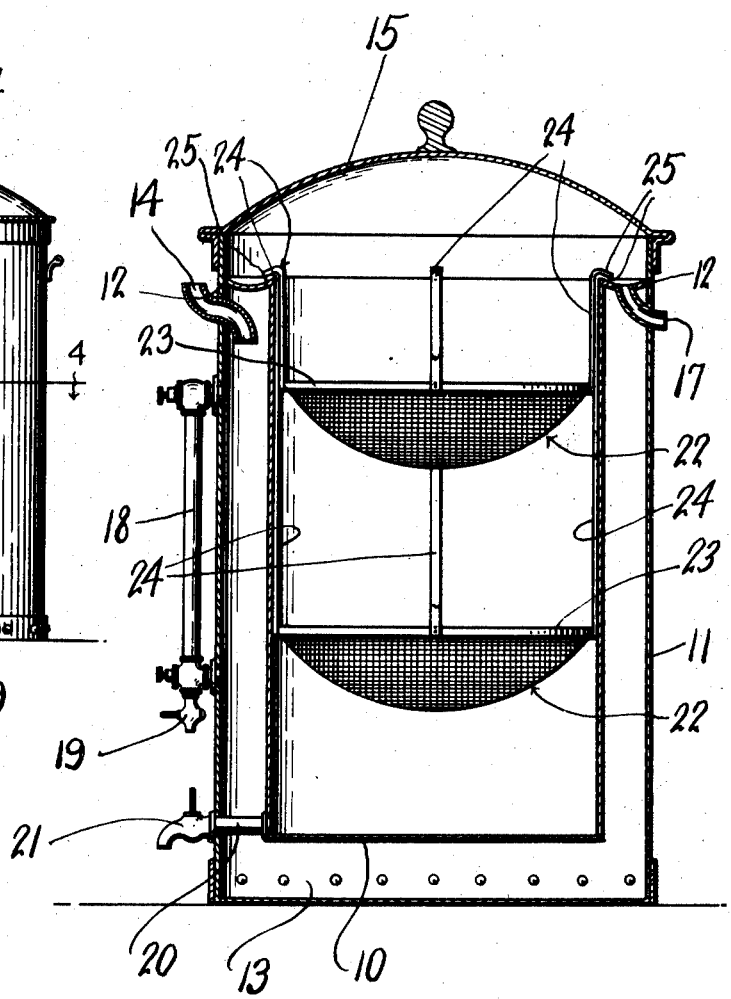
Fig. 2 is a vertical sectional view therethrough.

The steamer forming the subject matter of my invention comprises spaced inner and outer receptacles 10 and 11 respectively, which are joined at their upper edges as at 12, thus closing the space between the receptacles at the top thereof. The intervening space between the receptacles defines a water chamber 13 into which projects a filling tube 14. A cover 15 is detachably associated with the outer receptacle, and a steam escape tube 17 projects through the outer receptacle as shown. A gage tube 18 is arranged upon the outer receptacle and communicates with the water chamber 13 at both ends. A pet cock 19 is associated with the lower end of the tube 18. An outlet pipe 20 has one end communicating with the inner receptacle for drawing liquids therefrom, the pipe extending through the outer receptacle and equipped with a valve 21.

One or more trays such as shown in Fig. 5 are adapted to be arranged in spaced superimposed relation within the inner receptacle 10 and suspended from the upper edge thereof. Each tray is indicated at 22 and may be of any suitable construction. As shown in this specific instance, the body of the tray is made out of foraminous material reinforced by a metallic band surrounding the upper edge as at 23, while terminally connected to the band is a plurality of supporting arms 24. The arms can vary in length depending upon the desired location of the tray within the inner receptacle, the arms 24 terminating to provide hooks 25 which engage over the upper edge of the receptacle. The trays can be readily and easily removed from the steamer when desired. In practice, the chamber 13 is filled with water, or partly so through the tube 14, and when the water is heated to generate steam, the inner receptacle is heated to the proper temperature for the purpose intended. The pipe 17 provides a vent for the inner receptacle. The inner receptacle may be drained through the pipe 20.

While it is believed that from the foregoing description the nature and advantages of the invention will be readily apparent, I desire to have it understood that I do not limit myself in this connection, and that such changes may be resorted to when desired as fall within the scope of what is claimed.

What is claimed is:

1. A cooking vessel of the class described comprising spaced inner and outer receptacles defining a water chamber by the intervening space, said receptacles joined together at the upper ends, a filling tube projecting into said chamber, a detachable cover associated with the outer receptacle, a steam escape tube projecting through said outer receptacle, a gage tube provided on said receptacle and communicating with both ends of the water chamber, an outlet having one end communicating with the inner receptacle and extending through the outer receptacle, and a valve provided on said outlet.

2. A cooking vessel of the class described comprising spaced inner and outer receptacles defining a water chamber by the intervening space, said receptacles joined together at their upper ends, a filling tube projecting into said chamber, a detachable cover associated with the outer receptacle, a steam escape tube projecting through said outer receptacle, a gage tube provided on said receptacle and communicating with both ends of the water chamber, an outlet having one end communicating with the inner receptacle and extending through the outer receptacle, a valve provided on said outlet, a plurality of spaced superimposed trays removably arranged within the inner receptacle, means for suspending said trays from the upper edge of the receptacle, a metallic band surrounding said trays at the upper edge thereof to reinforce the latter.

In testimony whereof I affix my signature.

FRED D. JOBE.